(12) United States Patent
Chode et al.

(10) Patent No.: US 10,127,293 B2
(45) Date of Patent: Nov. 13, 2018

(54) COLLABORATIVE DATA INTELLIGENCE BETWEEN DATA WAREHOUSE MODELS AND BIG DATA STORES

(71) Applicant: International Business Machines Corporation, Armonk, NY (US)

(72) Inventors: Bibekananda C. Chode, Bangalore (IN); Chandra S. R. Kallur, Bangalore (IN); Ravi Kumar Reddy Kanamatareddy, Hyderabad (IN); Vinoth Vijayan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 14/672,304

(22) Filed: Mar. 30, 2015

(65) Prior Publication Data
US 2016/0292256 A1 Oct. 6, 2016

(51) Int. Cl.
*G06F 17/30* (2006.01)
(52) U.S. Cl.
CPC .. *G06F 17/30563* (2013.01); *G06F 17/30575* (2013.01)
(58) Field of Classification Search
CPC .................................................. G06F 17/30563
See application file for complete search history.

(56) References Cited

U.S. PATENT DOCUMENTS

| 7,315,849 | B2 | 1/2008 | Bakalash et al. | |
| 2004/0249644 | A1* | 12/2004 | Schiefer | G06Q 10/06375 705/7.37 |
| 2008/0235041 | A1* | 9/2008 | Cashdollar | G06Q 10/06 705/1.1 |
| 2011/0153611 | A1* | 6/2011 | Ankisettipalli | G06F 17/2247 707/740 |
| 2012/0317155 | A1 | 12/2012 | Ogasawara et al. | |
| 2013/0275363 | A1 | 10/2013 | Wu et al. | |
| 2013/0332460 | A1 | 12/2013 | Pappas et al. | |
| 2014/0122412 | A1* | 5/2014 | Bandekar | G06F 17/30563 707/602 |
| 2014/0156628 | A1 | 6/2014 | Raichelgauz et al. | |
| 2014/0172488 | A1* | 6/2014 | Jain | G06Q 10/06314 705/7.22 |
| 2014/0200989 | A1 | 7/2014 | Cohen Kassko et al. | |

(Continued)

OTHER PUBLICATIONS

Barbier et al.; "Data Mining in Social Media". Social Network Data Analysis (p. 327~352), Springer, New York, 2011.
(Continued)

*Primary Examiner* — Brittany N Allen
*Assistant Examiner* — William P Bartlett
(74) *Attorney, Agent, or Firm* — Alexa L. Ashworth; Brian M. Restauro

(57) ABSTRACT

Embodiments of the present invention provide a system and method for collaborative data intelligence. Embodiments of the present invention can include one or more data stores and one or more data warehouses (DWHs), each individually configured to communicate with a physical storage management system. Embodiments of the present invention can be used to manage the chaotic disorder of social data in real time, using a collaborative DWH model and big data store, in order to assess the potential of data integration to reporting and decision management.

20 Claims, 6 Drawing Sheets

(56) References Cited

U.S. PATENT DOCUMENTS

2014/0244447 A1* 8/2014 Kim .................. G06Q 30/0254
705/27.2
2014/0372346 A1* 12/2014 Phillipps .............. G06N 99/005
706/12

OTHER PUBLICATIONS

Dijcks, Jean-Pierre; "Oracle: Big Data for the Enterprise". An Oracle White Paper; Sep. 2014; Oracle. <http://www.oracle.com/technetwork/database/bigdata-appliance/overview/wp-bigdatawithoracle-1453236.pdf?ssSourceSiteId=ocomen>.

Kobielus, James; "The Next Big •H' in Big Data: Hybrid Architectures". IBM Data Magazine, May 6, 2013; <http://ibmdatamag.com/2013/05/the-next-big-h-in-big-data-hybrid-architectures/>.

Lee et al.; "Complementary Integration of Heterogeneous Crowd-sourced Datasets for Enhanced Social Analytics". 14th International Conference on Mobile Data Management, IEEE, 2013.

Li et al.; "Mining Unexpected Sequential Patterns and Implication Rules". Rare Association Rule Mining and Knowledge Discovery: Technologies for Infrequent and Critical Event Detection, 2009, Advances in Data Warehousing and Mining Book Series.

McGlohon et al.; "Statistical Properties of Social Networks". Social Network Data Analysis (p. 17-42), Springer, New York, 2011.

Mohanty et al.; "Big Data Imperatives: Enterprise Big Data Warehouse, BI Implementations and Analytics". Apress, Chapter 3 (p. 45~72), 2013.

Park et al.; "Searching Social Media Streams on the Web", Social Media Analytics and Intelligence. IEEE Intelligent Systems, vol. 25, No. 6, Nov./Dec. 2010.

Solomon et al.; "Modeling Social Media Collaborative Work". MiSE, pp. 43-49, Zurich, Switzerland, IEEE, 2012.

Tan et al.; "Social-Network-Sourced Big Data Analytics". IEEE Internet Computing, vol. 17, Issue 5, 2013.

"Big Data Integration Solutions". CISCO. <http://www.compositesw.com/solutions/big-data-integration/>.

"Method for Optimizing Big Data Augmentation of a Data Warehouse". IPCOM000233878D, Dec. 25, 2013, IP.com. <https://priorart.ip.com/IPCOM/000233878>.

"Oracle Database 12c for Data Warehousing and Big Data". Oracle White Paper; Sep. 2014, Oracle. <http://www.oracle.com/technetwork/database/bi-datawarehousing/data-warehousing-wp-12c-1896097.pdf>.

* cited by examiner

COLLABORATIVE DATA INTELLIGENCE BETWEEN DATA WAREHOUSE MODELS AND BIG DATA STORES

BACKGROUND OF THE INVENTION

The present invention relates generally to the field of managing data, and more particularly to the collaborative data management and integrated intelligence between data warehouse models and big data stores.

Data warehouses (DWHs) use business requirements and operational dependencies to store data in a well-defined schema for data analytics. Big data may be supplied by chaotic social sources through various means of web content, mail, short messages, etc., where there may not be any discernable ownership among the sources, however, insights into more information about the data may become apparent after the storage needs are fulfilled. The universal data being processed by big data infrastructures is chaotic in nature due to the location and source authenticity, anonymization process, high randomness in content, and lack of scheduled demand. The building of a key performance indicator (KPI) based business model for greater insights into the data may be relatively difficult without support by business aware peers for data restructuring techniques and supportive methodologies.

SUMMARY

According to one embodiment of the present invention, a system for collaborative data intelligence is provided, the system comprising: a data store and a data warehouse (DWH), wherein the data store and the DWH are configured to communicate with a storage management system; an integration bus, wherein the integration bus comprises at least one data analysis module; and a decision process application, wherein the decision process application comprises a result after processing data associated with the data store and the DWH.

According to another embodiment of the present invention, a method for analyzing data is provided, the method comprising: receiving, by an integration bus, a plurality of data, wherein the integration bus comprises at least one data analysis module; receiving, by the integration bus, from a data warehouse (DWH), a plurality of structured data; and performing, by the at least one data analysis module, a set of integration calculations associated with the data store and the DWH.

According to yet another embodiment of the present invention, a computer program product for analyzing data is provided, the computer program product comprising: a computer readable storage medium and program instructions stored on the computer readable storage medium, the program instructions comprising: program instructions to receive, by an integration bus, a plurality of data, wherein the integration bus comprises at least one data analysis module; program instructions to receive, by the integration bus, from a data warehouse (DWH), a plurality of structured data; and program instructions to perform, by the at least one data analysis module, a set of integration calculations associated with the data store and the DWH.

DETAILED DESCRIPTION

The large amounts of data processed by a big data infrastructure are often chaotic in nature, mined from various social media and web content. The building of a key performance indicator (KPI) based business model for greater insights into this data may be relatively difficult, unless the system is supported by business aware peers for data restructuring techniques and supportive methodologies, as this data, without any additional models or business insights, does not provide further insights into the meaning of the data. Embodiments of the present invention provide methods and systems for managing the chaotic disorder of social data in real time, using a collaborative data warehouse (DWH) model and big data store in order to assess the potential of data integration to reporting and decision management.

Figure 1:
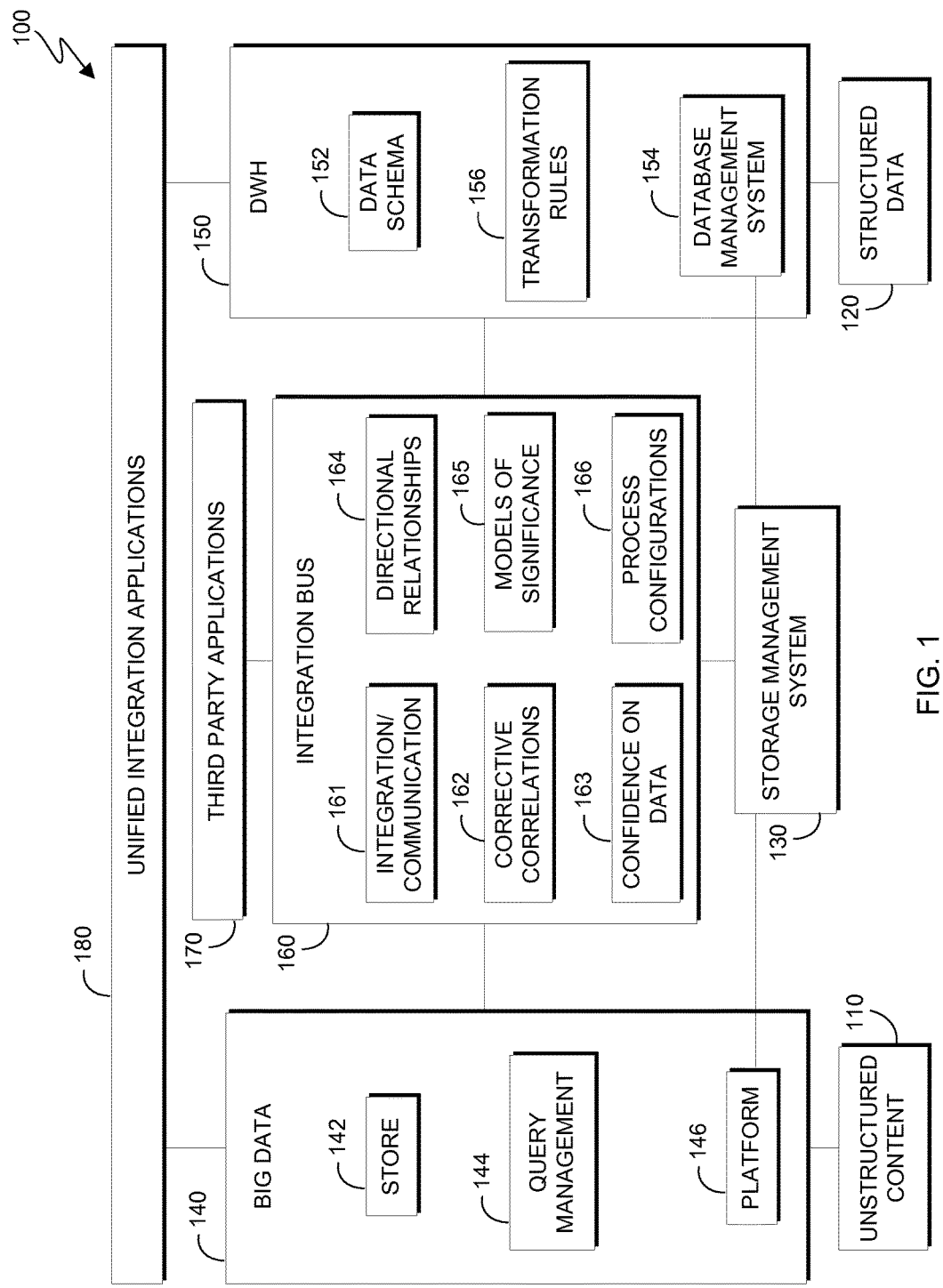
FIG. 1 depicts a functional block diagram of a data warehouse (DWH) and big data environment, in accordance with an embodiment of the present invention.

The present invention will now be described in detail with reference to the Figures. FIG. 1 depicts a functional block diagram illustrating a data warehouse (DWH) and big data environment, generally designated environment 100, in accordance with an embodiment of the present invention. Modifications to environment 100 may be made by those skilled in the art without departing from the scope of the invention as recited by the claims. In an exemplary embodiment, environment 100 includes unstructured content 110, structured data 120, storage management system 130, big data 140, data warehouse (DWH) 150, integration bus 160, third party applications 170, and unified integration applications 180.

Unstructured content 110 is the chaotic data supplied to big data 140, which comes from various social sources by means of web content, e-mail, short messages, etc. The data is received in irregular volumes and time intervals in the form of unstructured content. Structured data 120 is data from various sources supplied to DWH 150. Structured data 120 is organized and controlled data received in scheduled volumes from planned sources and can be organized into a schema (e.g., a fixed schema) to fit certain business models.

Storage management system 130 is a storage repository which communicates with platform 146 of big data 140 and database management system 154 of DWH 150. Storage management system 130 also communicates with integration bus 160. Storage management system is responsible for maintaining the physical store of the data being prepared and processed by big data stores (i.e., big data 140) and data warehouses (i.e., DWH 150). Storage management system 130 is managed by a physical file system provision for logical applications by big data stores and DWHs. The components of the big data stores, DWHs, third party applications, and the methods proposed throughout the application, use the physical file system on storage management system 130 to retain and manage: source data; normalized data; operational data; transitional data; and aggregate data. The terminology for these purposes are derived from the industry standard nomenclature of landing, staging, and storing, as applicable and as required by logical applications.

Big data 140 includes store 142, query management 144, and platform 146. Big data 140 communicates received data to integration bus 160 and outputs configured data to unified integration applications 180. In this exemplary embodiment, the queries for insights may not be of a broad nature of business needs due to the inherent data collection procedures as a simple store of fundamental capability. The big data lacking the required intelligence for appropriation of that data, as well as the queries, are fit to the business needs over time.

DWH 150 includes data schema 152, database management system 154, and transformation rules 156. DWH 150 receives structured data 120, applies relevant business rules and models using transformation rules 156, applies the relevant schema to the data using data schema 152, and communicates the data to integration bus 160. The configured data from DWH 150 is output to unified integration applications 180.

In this exemplary embodiment, third party applications 170 may include any additional application components for advanced data or model assessment and may operate in conjunction with integration bus 160. In other embodiments, third party applications 170 may be included/excluded from environment 100, as required by the needs of the system for advanced data or model assessments.

Unified integration applications 180 is the report and/or decision outputs of big data 140 and DWH 150 after data processing by integration bus 160. The output of unified integration applications 180 is a combined report between big data 140 and DWH 150, which takes into account the data processing and modeling of each component.

Integration bus 160 includes integration/communication module 161, corrective correlations module 162, confidence on data module 163, directional relationships module 164, models of significance module 165, and process configurations module 166. Each of these modules is configured to cover aspects of integration between DWH 150 and big data 140, including: master data; pre-aggregated or post-aggregated data; business reference details; and interpreted models.

The applications of integration/communication module 161 are predetermined with reference to integration options, which can include SQL, NonSQL (e.g., synchronous and asynchronous RPC, WebServices, etc.), and offline data parsing. SQL and NonSQL are direct interfaces to specific internal blocks within these two platforms, whereas the offline data parsers are dependent on external data load management. The method of diverse integrations forms a communication method for data management appropriation. The connections for data sharing are model driven and managed together by big data 140 and DWH 150, both configured to act as senders, as well as, recipients.

Integration bus 160 facilitates bidirectional communications between big data and DWH platforms (i.e., big data 140 and DWH 150), along with preemption policies. These bidirectional communications both maintain, and are corrective on the three critical needs of: scheduled workloads, caching heavy data payloads, and the integrity of synchronization. As the shared and/or collaborated landscape between big data 140 and DWH 150 can be business centric, scheduled workloads can include operations which are driven by timely and appropriate data availability. Caching heavy data payloads can include the rationale that, as the size of data being transacted between big data 140 and DWH 150 can be considerably large, the communication method needs a supportive setup for proxy caching the data delivery. The supportive setup can be in-line with the ingest capability/capacity of either side (i.e., big data 140 or DWH 150) and with the workload schedules requiring a redesign/readjustment. The integrity of synchronization recognizes that synchronization is a policy control which works on security, integration, protocols, etc., defined on both sides (i.e., big data 140 and DWH 150), and which can control the availability of data with the requisite quality for internal primary data updates, as well as, data aggregates and insights.

Figure 2:
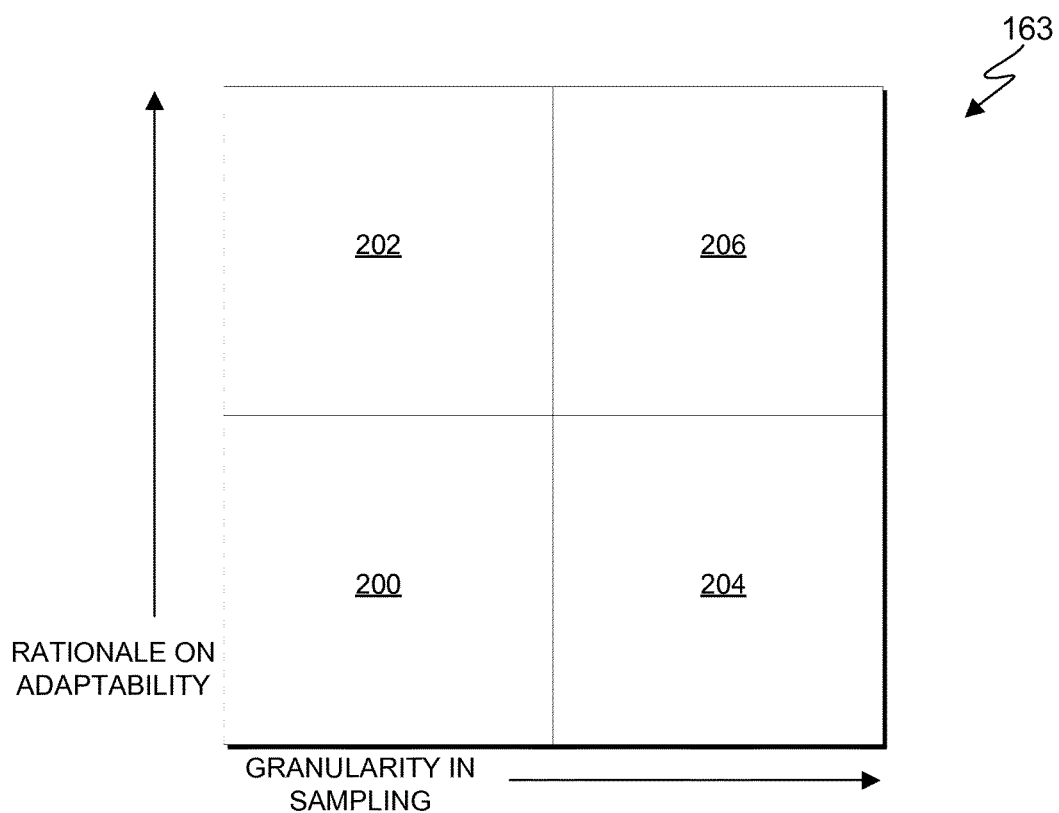
FIG. 2 depicts a quadrant diagram illustrating the levels of clarity on acceptability of big data, in accordance with an embodiment of the present invention.

FIG. 2 depicts a quadrant diagram illustrating the levels of clarity on acceptability of big data (i.e., confidence on data), in accordance with an embodiment of the present invention. Confidence on data module 163 configures the level of clarity and acceptability of big data. The volume of incoming data provides the flexibility to perform the data sampling, so that the data profiling is appropriate with reference to applicability, and at the same time, the volume of data required of the business cycles and schedules in operations (e.g., daily, weekly, etc.) is also met. In this exemplary embodiment, the three data dispositions for business appropriation algorithms are: frequency, volume, and source relevance. The higher the degree of freedom in composing the three data dispositions, the better the data profiling may be in business model driven analytics. The appropriation algorithm is iterative in order to choose the data with the highest level of rationale on adaptability and the highest level of granularity in sampling, to account for the incoming chaotic data which may not follow a precise trend. For example, as depicted in FIG. 2, four quadrants (200, 202, 204, and 206) depict different levels of acceptability of data. In this example, the rationale on adaptability is modeled against the granularity in sampling. Quadrant 200 has the lowest granularity in sampling and the lowest rationale on adaptability of the four depicted quadrants. Quadrant 200 represents a low frequency of data, low volume of data, and unknown source(s) of data, providing a low level of overall acceptability of the data. Quadrant 202 has a higher level of rationale on adaptability than quadrant 200 and the same level of granularity in sampling as quadrant 200. Quadrant 202 represents a high frequency of data, a low volume of data, and blended source(s) of data (i.e., data with high heterogeneity from known and unknown sources for a structured and unstructured arrangement), resulting in a medium level of overall acceptability of data. Similarly, quadrant 204 has a medium level of overall acceptability of data, as quadrant 204 represents a low frequency of data, a high volume of data, and blended source(s) of data. Quadrant 206 has the highest level of granularity in sampling and the highest level of rationale on adaptability of the four depicted quadrants, representing the highest level of acceptability of data, as there is a high frequency of data, a high volume of data, and relevant data sources.

Figure 3:
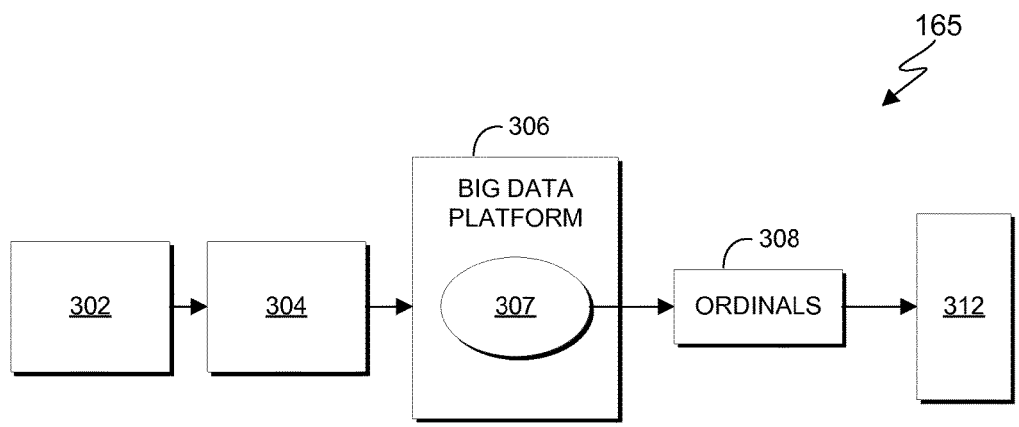
FIG. 3 depicts a diagram illustrating the identification of the appropriate ordinals from the scheduled cardinals among either source data or bulk big data documents, in accordance with an embodiment of the present invention.

FIG. 3 depicts a block diagram illustrating the identification of the appropriate ordinals from the scheduled cardinals among either source data or bulk big data documents by models of significance module 165, in accordance with an embodiment of the present invention. In this exemplary embodiment, rule translation algorithm 304 is performed on KPIs and business models in DWH 302, to be applied to big data processing. Stochastic and heuristic approaches known in the art are used to identify a set of appropriate ordinals 308 from a set of scheduled cardinals 307 from big data platform 306, which enables the DWH business models to identify the nominals for appropriateness 312 among the source data, for further use in data aggregates, insights, and reports.

Figure 4:
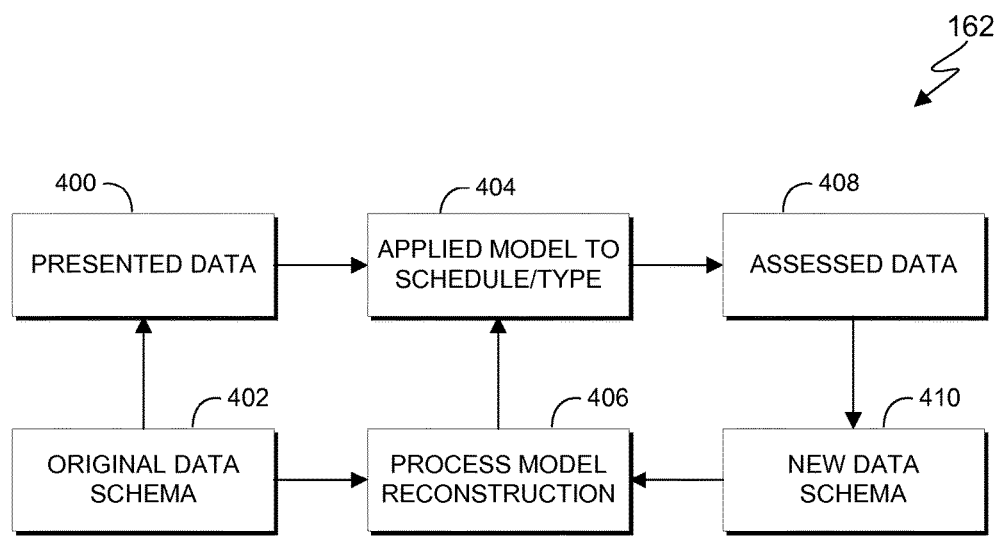
FIG. 4 depicts a block diagram illustrating the process synchronization between big data and a DWH, in order to recognize the appropriate corrective action(s), in accordance with an embodiment of the present invention.

FIG. 4 depicts a diagram illustrating the process synchronization between big data 140 and DWH 150, in order to recognize the appropriate corrective action(s), in accordance with an embodiment of the present invention. Corrective correlations module 162 configures the corrections, or appropriate alignment, between the model and the data in use. In this exemplary embodiment, corrective correlations module 162 adjusts to the variations of the schedule and 'techniques' of integration/communication module 161. Presented data 400 and original data schema 402 represent the initial state of the data. The data is then processed in a transition phase through applied model to schedule/type 404 and process model reconstruction 406. The updates to the data processing models occur in real-time when the data is presented for either primary or aggregate processing in the cycle of 'quantification' to models of significance module 165. The resulting assessed data 408 and new data schema 410 represent the data in a reconstructed state. Model training is the subsequent activity once the corrections for both data model and process model are imposed in scheduled data processing requests.

Figure 5:
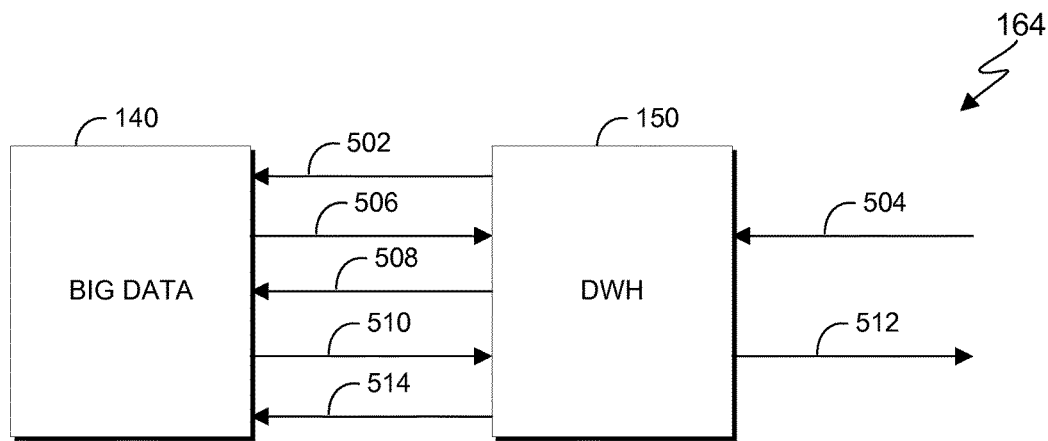
FIG. 5 depicts an example of a task description of the directional assessment on data and model by a directional relationships module, in accordance with an embodiment of the present invention.

FIG. 5 depicts an example of a task description of the directional assessment on data and model by directional relationships module 164, in accordance with an embodiment of the present invention. Directional relationships module 164 configures the direction of order between big data 140 and DWH 150, for synthesizing the scheduled data model use and applying the requisite model. In this exemplary embodiment, the relationship is modeled as bidirectional on function, based on the interaction either with the data (i.e., big data 140) or the model (i.e., DWH 150) as a first requirement. The task composition is a construct which uses many interactions to fulfill a data management demand. In this exemplary embodiment, interpreted model 502 is imported from DWH 150 to big data 140. A normalization process 504 against masters occurs in DWH 150, then DWH 150 analyzes insights 506 from big data 140. The latest reference upload 508 is sent to big data 140, and aggregates from social data 510 are obtained by big data 140 and sent to DWH 150. DWH 150 compiles the data into hybrid data 512, which creates a provisional data schema. DWH 150 sends the structured backup data 514 to a store of big data 140. The design for initial deployment can perform the auto synchronization over a significant period of operational time for refined granularity of the data versus model dependencies. In some embodiments, entire sequences, or functional compositions, can follow any individual means of integration.

Figure 6:
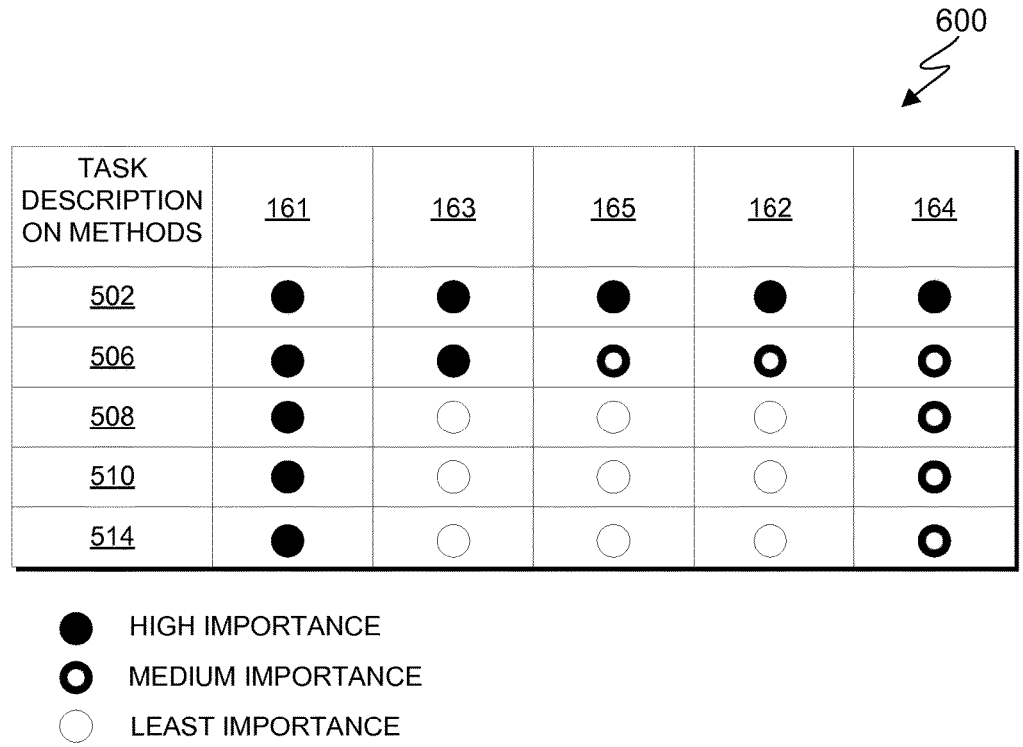
FIG. 6 depicts an example table detailing a method of the task description of the directional assessment on data and model of FIG. 5, in accordance with an embodiment of the present invention.

FIG. 6 depicts an example table 600 detailing a method of the task description of the directional assessment on data and model of FIG. 5, in accordance with an embodiment of the present invention. FIG. 6 depicts table 600, modeling the importance of each sub-method (i.e., integration/communication 161, confidence on data 163, models of significance 165, corrective correlations 162, and directional relationships 164) to a set of task compositions from FIG. 5 (i.e., interpreted model 502, insights 506, latest reference upload 508, social data 510, and backup data 514). As depicted in the example table 600 of FIG. 6, the sub-method integration/communication 161 is of 'high importance' for each of the task compositions (discussed above), as the connections for data sharing are model driven, and are corrective for scheduled workloads, caching heavy data loads, and controlling synchronization (as described above). As further depicted in the example use case, the sub-method confidence on data 163 is of high importance to the task compositions of interpreted model 502 and insights 506, which both take place early on in the method process as data is being received and cleansed for further interpretation. The confidence on data 163 sub-method is of least importance to the other three task compositions. Models of significance 165 sub-method is of high and medium importance to the task compositions interpreted model 502 and insights 506, respectively. Similarly to the confidence on data 163 sub-method, models of significance sub-method 165 allows for identifying appropriateness of data in cleansing and shaping for reports and insights, thus, it is of most significance when big data is coming in to the system, and of little purpose for the task compositions of latest reference upload 508, social data 510, and backup data 514. Corrective correlations sub-method 162 follows a similar pattern as models of significance sub-method 165. Corrective correlations sub-method 162 deals with the corrective alignment of big data 140 and DWH 150 in real-time, as data is received for aggregate processing, and thus, is of most importance for task composition interpreted model 502, is of medium importance to insights 506, and is of little importance to the remaining three tasks. As the task compositions of FIG. 5 follow a bidirectional relationship, based on the interaction with the data (i.e., big data 140) or model (i.e., DWH 150) as a first requirement, a certain directional importance of each of the task compositions is maintained, and the directional relationships sub-method 164 is of at least a medium importance for each depicted task composition.

Figure 7:
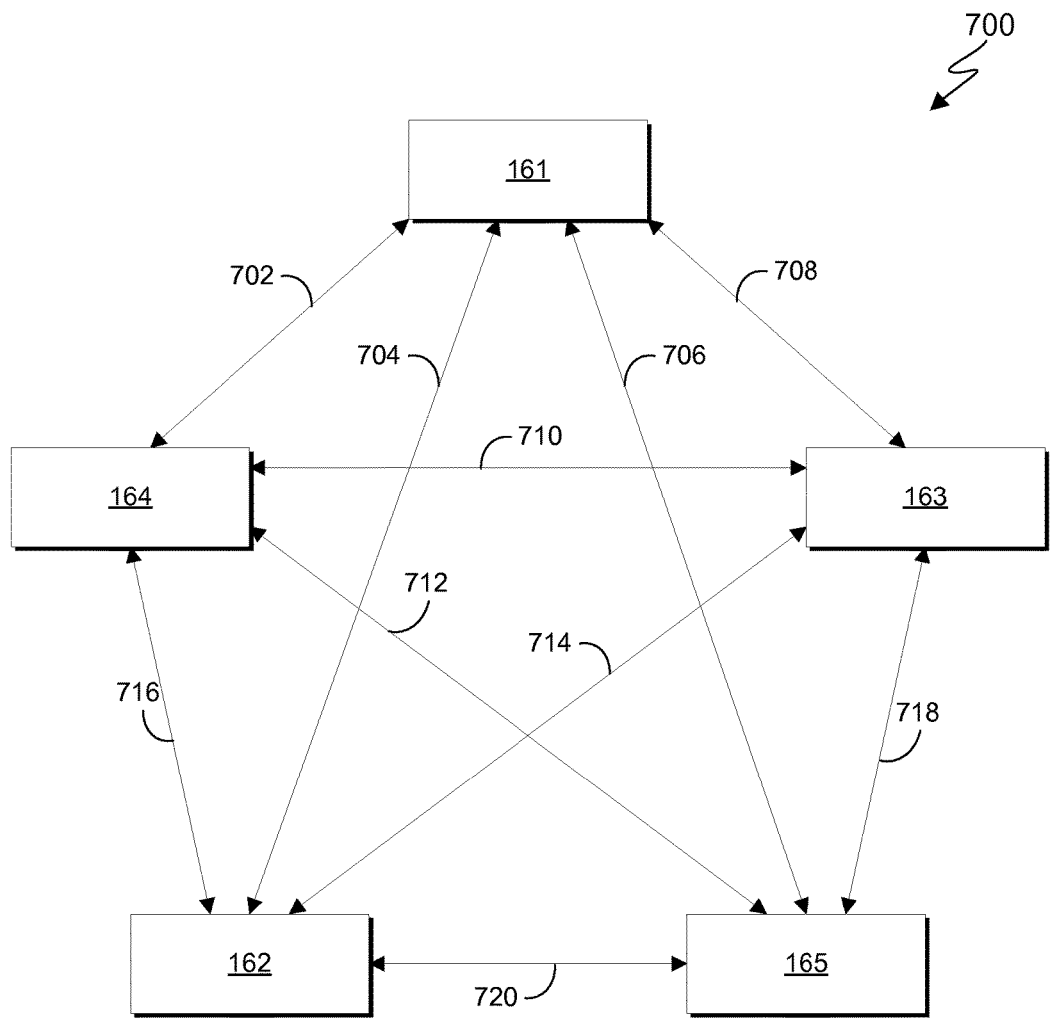
FIG. 7 depicts a pentagon web diagram of conjunctive and logical interactions for supporting hybrid data management tasks, in accordance with an embodiment of the present invention.

FIG. 7 depicts a pentagon web diagram 700 of conjunctive and logical interactions for supporting hybrid data management tasks, in accordance with an embodiment of the present invention. In this exemplary embodiment, hybrid data management tasks are highly dependent on business process and workload scenarios. The task composition interoperates across all five modules (i.e., 161, 162, 163, 164, and 165) where each task design can perform the scheduled activity of data management with reference to usage of data and model workings. At any time of single module implication, all other modules are interpreted for the appropriate reasoning. All necessary scenarios of creating the hybrid behavior between big data 140 and DWH 150 can be fulfilled through the enabled interactions between the five derived modules.

In interaction 702, the interaction between integration/communication module 161 and directional relationships module 164 is modeled. This interaction represents that the direction for integration is protocol specific where a communication is for a request and a response. However, the task composition determines the dependency from either big data 140 or DWH 150, with reference to the acquisition of data (i.e., big data 140) or to training/applying the model (i.e., DWH 150).

In interaction 704, the interaction between integration/communication module 161 and corrective correlations module 162 is modeled. Corrective correlations module 162 may trigger various other third party applications 170, in which the integration protocols become a mandate for communications. The data to be assessed can be a very large payload, from which the data profiling is achieved. The data profile can be imposed onto the model as feedback to accommodate the updates and/or changes.

In interaction 706, the interaction between integration/communication module 161 and models of significance module 165 is modeled. In this interaction, the payload is determined with reference to the quantification on the data supplied and signifies the population data on a legacy model. The normalization of the legacy model is an end result and uses the method of finding the right confidence in coefficients among the supplied data.

In interaction 708, the interaction between integration/communication module 161 and confidence on data module 163 is modeled. In this interaction, the data with the required character has a very high threshold on how the communication bridge is created between big data 140 and DWH 150. The flow is cyclic until the scheduled operations and the push or pull for the acquisition of data is determined by the method of directional relationships (detailed in FIG. 5).

In interaction 710, the interaction between confidence on data module 163 and directional relationships module 164 is modeled. In this interaction, the data maturity is performed based on finding the nominals among the scheduled operations and operates specifically to create the hybrid data and directions of storage by either production or archive.

In interaction 712, the interaction between directional relationships module 164 and models of significance module 165 is modeled. In this interaction, the application of a legacy model flows from DWH 150 to big data 140, however, the method of corrective correlations invokes the necessary changes to the data or the model, which are based on another method derivative of directional relationships (i.e., corrective correlations module 162).

In interaction 714, the interaction between corrective correlations 162 and confidence on data module 163 is modeled. In this interaction, when DWH 150 is invoked to take in big data 140, DWH 150 can look for a correction for the model training or can change the model structure itself. DWH 150 can also invoke a change in the intake pattern and to the data schema, while storing the pattern.

In interaction 716, the interaction between corrective correlations 162 and directional relationships 164 is modeled. In this interaction, when the corrections are imposed, the direction of impact can be either toward big data 140 or toward DWH 150, and specifically, to the corresponding application or to the storage archives. The delivery of any changes requires the imposition of the context-based interactions across these two platforms (i.e., big data 140 and DWH 150) and the designated correctable segments within each platform.

In interaction 718, the interaction between confidence on data module 163 and models of significance 165 is modeled. In this interaction, the model appropriation is done with reference to a segment of data, as understood from a set of complex, categorized social data. This can also be applied to the current and historical data of facts in DWH 150.

In interaction 720, the interaction between corrective correlations 162 and models of significance 165 is modeled.

In this interaction, an assessment of the correct model and the applicability of the model to the currently available data patterns, allows for corrective adjustments to the input and the data processing. The corrections are very important to data models due to the chaotic nature of the data and the constantly changing business goals of the data from the input.

Figure 8:
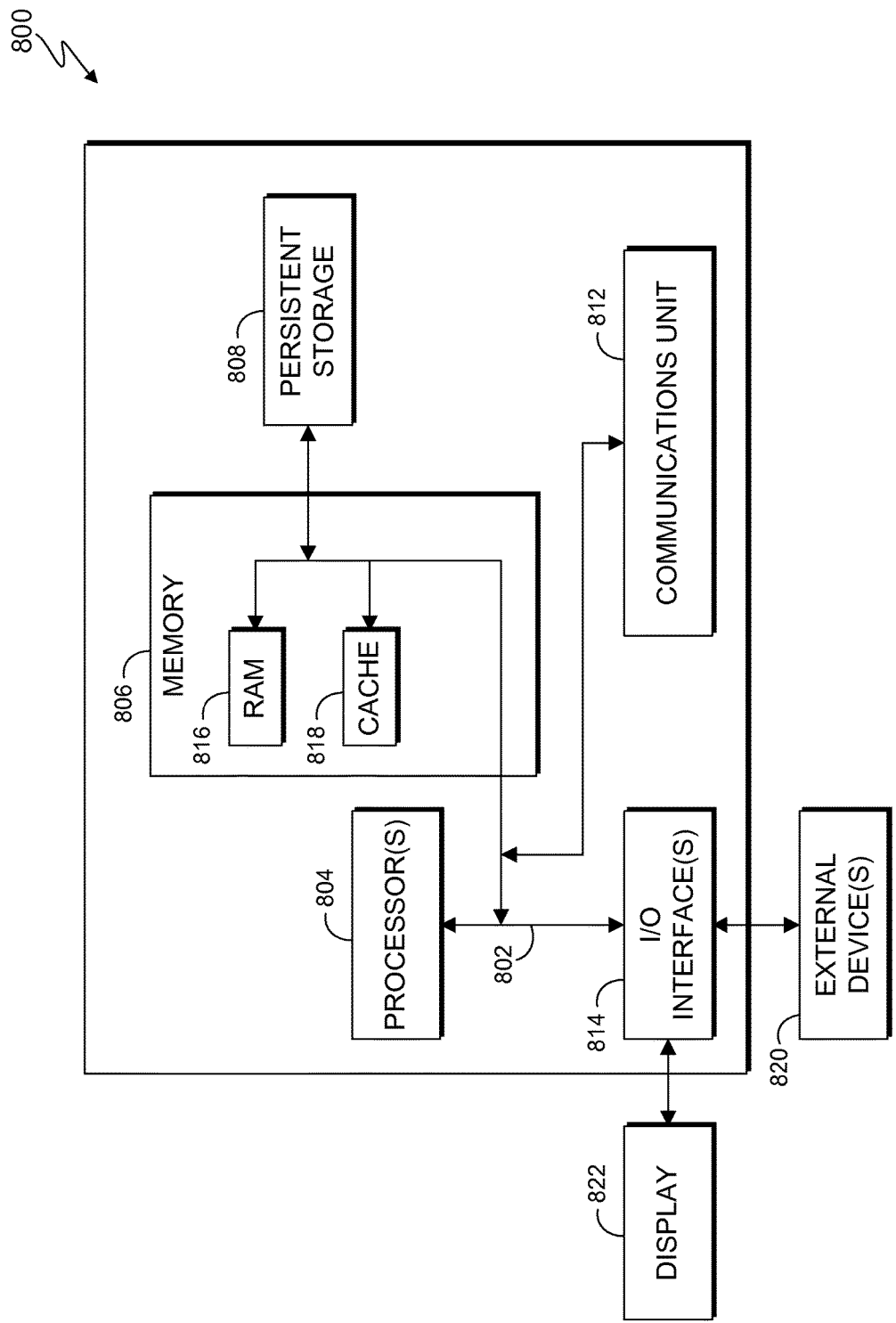
FIG. 8 depicts a block diagram of internal and external components, in accordance with an embodiment of the present invention.

FIG. 8 is a block diagram of internal and external components of a computer system 800, which is representative of the computer systems of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 800 includes communications fabric 802, which provides for communications between one or more processors 804, memory 806, persistent storage 808, communications unit 812, and one or more input/output (I/O) interfaces 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media. Software is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 812 provides for communications with other computer systems or devices via a network. In this exemplary embodiment, communications unit 812 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to a computing device through communications unit 812 (e.g., via the Internet, a local area network or other wide area network). From communications unit 812, the software and data can be loaded onto persistent storage 808.

One or more I/O interfaces 814 allow for input and output of data with other devices that may be connected to computer system 800. For example, I/O interface 814 can provide a connection to one or more external devices 820 such as a keyboard, computer mouse, touch screen, virtual keyboard, touch pad, pointing device, or other human interface devices. External devices 820 can also include portable computer-readable storage media such as, for example, thumb drives, portable optical or magnetic disks, and memory cards. I/O interface 814 also connects to display 822.

Display 822 provides a mechanism to display data to a user and can be, for example, a computer monitor. Display 822 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A collaborative data intelligence system, the system comprising:
    a data store and a data warehouse (DWH), wherein the data store and the DWH are configured to communicate with a storage management system;
    an integration bus, wherein the integration bus comprises at least one data analysis module;
    a decision process application, wherein the decision process application comprises a result after processing data associated with the data store and the DWH;
    one or more computer processors;
    one or more computer-readable storage media;
    program instructions stored on the computer-readable storage media for execution by at least one of the one or more computer processors, the program instructions comprising:
        program instructions to receive a plurality of data that can either be structured or unstructured from a data store storing web content;
        program instructions to receive, from a data warehouse (DWH), a plurality of structured data;
        program instructions to facilitate communications of the plurality of structured data from the DWH and the plurality of data from the data store in a bi-directional manner using proxy caching for data delivery, wherein the program instructions to facilitate communications comprises:
            program instructions to standardize the plurality of data and the plurality of structured data with respect to either the plurality of data from the data store or the plurality of structured data received from the DWH using a set of integration calculations associated with the data store and the DWH, wherein the standardized plurality of data and plurality of structured data perform a hybrid management of workloads of the DWH and the data store, wherein the set of integration calculations comprise:
            program instructions to schedule workloads of the DWH and the data store based on task composition with respect to either the DWH or the data store in the bi-directional manner, and
            program instructions to maintain integrity of synchronization of data between the DWH and the data store;
            program instructions to correct the communications between the DWH and the data store;
            program instructions to update in real time the standardized plurality of data and plurality of structured data; and
            program instructions to generate a decision report for the standardized plurality of data and plurality of structured data.

2. The system of claim 1, further comprising:
    at least one application, wherein the at least one application is configured to communicate with the integration bus.

3. The system of claim 1, wherein the at least one data analysis module comprises: an integration module, a data acceptability module, a modeling module, a corrective module, and a directional module.

4. The system of claim 1, wherein the at least one data analysis module is configured to include at least one aspect of integration between the DWH and the data store, and wherein the at least one aspect of integration comprises: master data, pre-aggregated data, post-aggregated data, business reference details, and interpreted models.

5. The system of claim 1, wherein the at least one data analysis module is configured with predetermined integration options.

6. The system of claim 1, wherein the at least one data analysis module is configured to determine a level of acceptability of data associated with the data store.

7. The system of claim 1, wherein the at least one data analysis module is configured to identify a set of ordinals from a set of cardinals included in a plurality of source data.

8. The system of claim 1, wherein the at least one data analysis module is configured to identify corrections to processed data associated with the DWH and the data store.

9. The system of claim 1, wherein the data store is configured to receive unstructured data, and wherein the unstructured data comprises: web content, e-mails, and social media data.

10. The system of claim 1, wherein the result after processing the data associated with the data store and the DWH comprises a combined report.

11. The system of claim 1, wherein the storage management system is configured to maintain a physical store of the data associated with the data store and the DWH.

12. A method for analyzing data, the method comprising:
    receiving, by an integration bus, a plurality of data that can either be structured or unstructured from a data store storing web content, wherein the integration bus comprises at least one data analysis module;
    receiving, by the integration bus, from a data warehouse (DWH), a plurality of structured data;
    facilitating communications of the plurality of structured data from the DWH and the plurality of data from the data store in a bi-directional manner using proxy caching for data delivery, wherein the program instructions to facilitate communications comprises:

standardizing the plurality of data and the plurality of structured data with respect to either the plurality of data from the data store or the plurality of structured data received from the DWH using a set of integration calculations associated with the data store and the DWH, wherein the standardized plurality of data and plurality of structured data perform a hybrid management of workloads of the DWH and the data store, wherein the set of integration calculations comprises:
  scheduling workloads of the DWH and the data store based on task composition with respect to either the DWH or the data store in the bi-directional manner, and
  maintaining integrity of synchronization of data between the DWH and the data store;
  correcting the communications between the DWH and the data store;
  updating in real time, by the at least one data analysis module, the standardized plurality of data and plurality of structured data; and
  generating, by the at least one data analysis module, a decision report for the standardized plurality of data and plurality of structured data.

13. The method of claim 12, wherein the decision report comprises information associated with the set of integration calculations made by the at least one data analysis module.

14. The method of claim 13, wherein the decision report comprises a combined report from the data store and the DWH.

15. The method of claim 12, wherein the at least one data analysis module comprises: an integration module, a data acceptability module, a modeling module, a corrective module, and a directional module.

16. The method of claim 12, further comprising:
  receiving, by the data store, unstructured data, wherein the unstructured data comprises web content, e-mails, and social media data.

17. The method of claim 12, wherein performing, by the at least one data analysis module of the integration bus, a set of integration calculations associated with the data store and the DWH comprises:
  determining, by the at least one data analysis module, a level of acceptability of data associated with the data store;
  identifying, by the at least one data analysis module, a set of ordinals from a set of cardinals included in a plurality of source data; and
  identifying, by the at least one data analysis module, corrections to processed data associated with the DWH and the data store.

18. The method of claim 12, wherein the set of integration calculations are performed simultaneously.

19. A computer program product comprising:
  a computer readable storage medium and program instructions stored on the computer readable storage medium for execution by at least one or more processors, the program instructions comprising:
    program instructions to receive a plurality of data that can either be structured or unstructured from a data store storing web content
    program instructions to receive, from a data warehouse (DWH), a plurality of structured data;
      program instructions to facilitate communications of the plurality of structured data from the DWH and the plurality of data from the data store in a bi-directional manner using proxy caching for data delivery, wherein the program instructions to facilitate communications comprises:
        program instructions to standardize the plurality of data and the plurality of structured data with respect to either the plurality of data from the data store or the plurality of structured data received from the DWH using a set of integration calculations associated with the data store and the DWH, wherein the standardized plurality of data and plurality of structured data perform a hybrid management of workloads of the DWH and the data store, wherein the set of integration calculations comprise:
        program instructions to schedule workloads of the DWH and the data store based on task composition with respect to either the DWH or the data store in the bi-directional manner, and
        program instructions to maintain integrity of synchronization of data between the DWH and the data store;
        program instructions to correct the communications between the DWH and the data store;
        program instructions to update in real time the standardized plurality of data and plurality of structured data; and
        program instructions to generate a decision report for the standardized plurality of data and plurality of structured data.

20. The computer program product of claim 19, wherein the at least one data analysis module comprises: an integration module, a data acceptability module, a modeling module, a corrective module, and a directional module.

* * * * *